(12) United States Patent  
Roskowski et al.

(10) Patent No.: US 7,941,148 B2
(45) Date of Patent: *May 10, 2011

(54) NEIGHBOR LIST GENERATION IN WIRELESS NETWORKS

(75) Inventors: Steve Roskowski, Los Gatos, CA (US); Bruce Alan Leak, Los Altos Hills, CA (US)

(73) Assignee: Carrier IQ, Inc., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/870,682

(22) Filed: Aug. 27, 2010

(65) Prior Publication Data

US 2011/0009135 A1    Jan. 13, 2011

Related U.S. Application Data

(63) Continuation of application No. 11/777,950, filed on Jul. 13, 2007, now Pat. No. 7,826,847.

(51) Int. Cl.
*H04W 36/00* (2009.01)

(52) U.S. Cl. .............. 455/436; 455/440; 455/432.1; 455/433

(58) Field of Classification Search .............. None
See application file for complete search history.

(56) References Cited

U.S. PATENT DOCUMENTS

| | | | | |
|---|---|---|---|---|
| 6,073,021 A * | 6/2000 | Kumar et al. | ............... | 455/442 |
| 7,742,391 B2 * | 6/2010 | Yu et al. | ............... | 370/208 |
| 2003/0210713 A1 * | 11/2003 | Abdel-Ghaffar | ............... | 370/503 |
| 2005/0020203 A1 * | 1/2005 | Losh et al. | ............... | 455/11.1 |
| 2005/0232199 A1 * | 10/2005 | Liu et al. | ............... | 370/331 |
| 2008/0186922 A1 * | 8/2008 | Merson et al. | ............... | 370/331 |
| 2009/0170548 A1 * | 7/2009 | Soliman | ............... | 455/522 |

* cited by examiner

*Primary Examiner* — Ajit Patel
(74) *Attorney, Agent, or Firm* — Patentry

(57) ABSTRACT

Generating neighbor lists. A set of devices are provisioned to report on neighbor lists and visibility of sectors. Each device in the set of devices generates event data that includes the neighbor list from a sector, other sectors visible while using the neighbor list, and/or sectors visible to the device if the call was dropped or lost. The event data of each device is received at a management system. The management system can derive recommended neighbor lists for each sector in a wireless network based on the cumulative event data received from the set of devices operating in the network.

29 Claims, 4 Drawing Sheets

NEIGHBOR LIST GENERATION IN WIRELESS NETWORKS

CROSS REFERENCE TO RELATED APPLICATIONS

This application is a continuation of Ser. No. 11/777,950 of the same title and inventors, incorporates the application in its entirety, and claims the priority date of Jul. 13, 2007.

BACKGROUND OF THE INVENTION

1. The Field of the Invention

The present invention relates generally to the operation of devices in wireless networks. More particularly, embodiments of the invention relate to systems and methods for generating neighbor lists used by devices operating in wireless networks.

2. The Relevant Technology

The convenience and utility of wireless devices including cellular phones is undeniable. As technology continues to improve, cellular phone users are increasingly expecting more from their wireless network. Whenever a user has an adverse experience with a wireless network such as being unable to access the wireless network or experiencing a dropped call, the user is inconvenienced and unsatisfied with the performance of the wireless network. As a result, providers of wireless networks often strive to ensure that a wireless device has access to their wireless network and to ensure that adverse experiences such as dropped calls do not occur.

To achieve these goals, a wireless provider typically deploys multiple towers in the wireless network in a manner that is intended to provide satisfactory coverage. The towers are hopefully arranged in a manner that ensures, regardless of where a particular device is located in the wireless network, that the particular device has access to the network without experiencing problems such as a dropped call or weak signal.

One of the key features of wireless devices is that they are mobile in nature and are therefore unlikely to remain in the same location, even during a single call. People often use their wireless devices, for example, as they travel within the network. Because of this movement, a user may move out of the range of a particular tower. The need to switch the call over to another tower therefore arises. One of the factors that complicates this switching process is that the towers used by devices in the network are often approached using different paths and from multiple directions. As a result, the process of handing off a call from one tower to another can be complicated.

One of the ways that a wireless provider ensures that a call can be switched from one tower to the next and therefore ensure that the call is not dropped is through the use of neighbor lists. During a call from a wireless device, the primary sector of a tower may provide the wireless device with a neighbor list. The neighbor list identifies other towers or tower sectors that the wireless device may encounter during the call. As the device changes from one primary sector to a new primary sector, the neighbor list is updated or replaced by the new primary sector. The neighbor list becomes an important aspect of ensuring that a wireless network provides quality service to users.

Unfortunately, one of the common problems experienced in wireless networks is related to the neighbor list. A neighbor list that does not adequately describe or identify the towers or tower sectors that wireless devices may encounter during use will lead to problems such as dropped calls and to customer dissatisfaction. The generation of a neighbor list, however, is not a trivial exercise. There are many factors that make it difficult to identify the tower sectors that should be included in the neighbor list of a given sector. Variable radio propagation due to contributing factors such as terrain, deployment errors, power changes, and load based changes are examples of factors that can impact the tower sectors that a wireless device might encounter.

As a result, the neighbor lists actually delivered to wireless devices do not necessarily include all of the appropriate neighbors of the primary tower sector currently being used. Further, because users are traveling in different directions and in different paths with respect to primary sectors, each device is typically exercising a different portion of the primary sector's neighbor list.

Neighbor list problems can be very difficult to resolve via field testing because of all the possible paths and directions of travel that correspond to real world device usage. Because there are multiple paths and directions of travel, different parts of any given neighbor list can be exercised. Thus, neighbor list problems continue to create various problems in a wireless network that are difficult to resolve.

While the fact that a particular tower sector is not included on a neighbor list may seem inconsequential, it in fact can disrupt the use of a cellular device. For example, assume that there is a tower sector that is not currently on a neighbor list of a wireless device. If this tower sector becomes a strong radio source due to environmental changes or other factors, then it is likely that the cellular communication will be lost or dropped due to interference from the missing neighbor. In other words, tower sectors that are not included in a neighbor list can interfere with existing communications and cause calls to be lost or cause other problems. For these and other reasons, neighbor list errors can disrupt cellular service in addition to inconveniencing users. Systems and methods are therefore needed to reduce neighbor list errors as well as to more effectively identify ideal neighbor lists for the tower sectors in a wireless network.

SUMMARY OF THE INVENTION

These and other limitations are overcome by embodiments of the invention, which relate to systems and methods for generating recommended neighbor lists for sectors of towers in a wireless network. A set of devices operating in the network collects data related to neighbor lists and uploads the collected data to a management system. The management system can evaluate the cumulative data to derive recommended neighbor lists based on the aggregate device usage. In some instances, additional sectors are added to the recommended neighbor list while in other situations, sectors may be excluded from the recommended neighbor list. Also, a particular sector can distribute distinct neighbor lists to different devices based on device usage or expected usage.

In one example, a system receives event data from devices operating in a wireless network. The cumulative event data typically includes a neighbor list for each sector as well as a list of sectors that were visible to each device while using the corresponding neighbor list. The cumulative event data is reviewed for each sector to derive the recommended neighbor list. The recommended neighbor lists for the various sectors can then be pushed to the relevant sectors, which in turn deliver the new neighbor lists to devices in the network as needed. As the cumulative event data increases over time, the recommended neighbor lists become more ideal and account for many of the factors or parameters in a network that often contribute to neighbor list errors.

In another embodiment, the generation of a recommended neighbor list for a given sector begins by recording a current neighbor list as it is received at a device. The current neighbor list typically identifies sectors that should be visible to the device. The device then records each sector that is actually visible to the device while using the current neighbor list. Often, the devices are first provisioned with a collection profile that enables the appropriate data to be recorded as event data.

After experiencing an event, such as a dropped call, that resets the state data of the device, the device records additional sectors that become visible to the device, but were not included in the current neighbor list. The resulting event data is provided to a management system, which uses the event data along with event data from other devices operating in the network to generate a recommended neighbor list that incorporates the actual performance of the network from the perspective of the devices operating in the network. In some instances, the management system may filter the cumulative event data using a neighbor list signature to identify the event data that is presumably associated with or attributable to a neighbor list problem.

Of course, it is not necessary to experience a network problem in order to record and report event data. For instance, the neighbor lists associated with a successful usage of the device may also be reported. In many cases, the event data can be stored at the device and retrieved at a later time.

In another embodiment, the neighbor lists can be customized for specific devices. In other words, the usage patterns of a particular device can be used to generate neighbor lists that are appropriate for a specific device. As a result, neighbor lists that are derived or generated based on cumulative data collected from multiple devices may be the same as or differ from the neighbor list generated for a specific device.

The development of a customized neighbor list can include tracking the usage of a particular device over time. This can include developing a pattern of the device usage as the user travels. Over time, the usage of the device can be used to generate a neighbor list for that device that accounts for the expected usage of the device. A customized neighbor list can reduce network problems, for example, because the sectors likely to be needed by the user are include and, potentially prioritized, in the customized neighbor list.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the advantages and features of the invention are obtained, a particular description of the invention will be rendered by reference to specific embodiments thereof which are illustrated in the appended drawings. Understanding that these drawings depict only typical embodiments of the invention and are not, therefore intended to be considered limiting of its scope, the invention will be described and explained with additional specificity and detail through the use of the accompanying drawings in which.

DETAILED DESCRIPTION OF THE PREFERRED EMBODIMENTS

Figure 1:
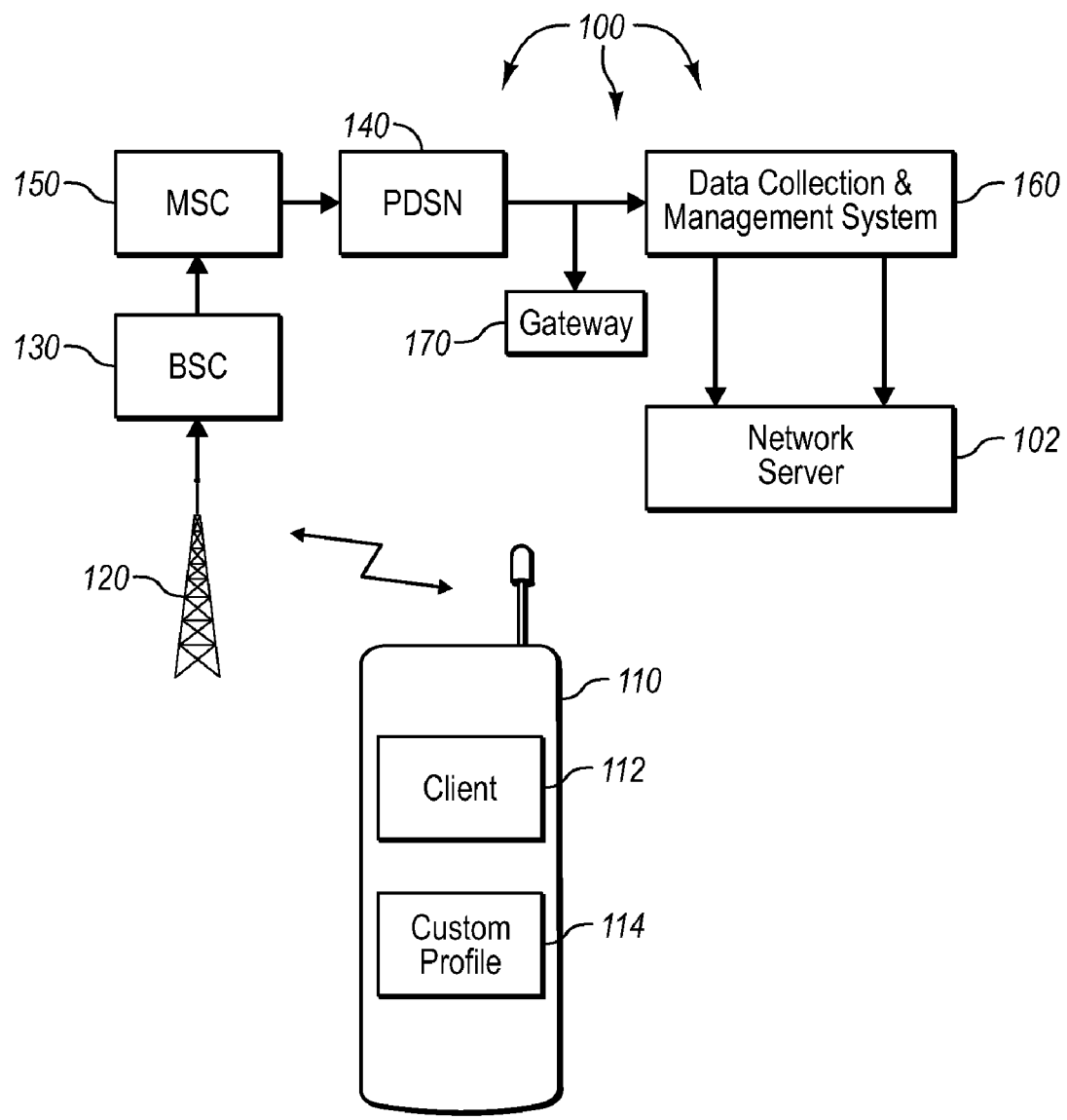
FIG. 1 illustrates one embodiment of a communications network over which wireless communications can be transmitted.

Embodiments of the invention relate to addressing network problems by resolving neighbor list errors and more particularly to generating or optimizing neighbor lists that are distributed by sectors in a wireless network. Neighbor lists often act as a constraint on a device by restricting the sectors that a device may look to for radio communication. Neighbor list errors can interfere with usage of a wireless device and degrade the performance of a wireless network.

Neighbor list errors can be reduced or eliminated by provisioning wireless devices with the ability to collect information related to neighbor lists. Each wireless device can then capture event data that identifies the tower or tower sector (also referred to herein as pilot) that provided the neighbor list to the device. The event data of the device may also identify all of the sectors that are seen by the device while using that specific neighbor list. Event data is not limited to the information collected during or after a call, but includes situations where the device collects information about the network when the device is not being used. Further, event data is not limited to situations where a problem (such as a dropped call) occurs, but includes data generated where device usage is successful. The cumulative event data from all devices can then be systematically analyzed to ascertain the best neighbor list that a device should receive from each sector.

The event data collected from the device can be further augmented with data collected shortly after the termination of a call while utilizing a specific sector. During normal operation, a device will typically re-establish network connectivity after each call. This after call sector information has less reliance on the existing neighbor list. As a result, if a sector is missing from a specific neighbor list, it is most likely to be discovered by the device at the point of network acquisition immediately after the call. The analysis can result in the addition and/or removal of certain sectors from the neighbor lists that are delivered to and used by wireless devices. In some instances, network connectivity can be initiated specifically to collect event data that may be used in resolving neighbor list problems.

A wireless device, as used herein, enables an end user to gain access to telephony services and may be equipped to provide access to Internet or multimedia data through any suitable protocol that allows a wireless device to participate in a packet data network. A wireless device may be, by way of example, a cellular telephone, a personal digital assistant (PDA), a laptop computer, or another wireless communication device.

Reference will now be made to the drawings to describe various aspects of exemplary embodiments of the invention. It should be understood that the drawings are diagrammatic and schematic representations of such embodiments and, accordingly, are not limiting of the scope of the present invention, nor are the drawings necessarily drawn to scale. Although embodiments of the invention are described in the context of wireless networks and with particular attention to neighbor list errors, of skill in the art, with the benefit of the present disclosure, can appreciate the applicability of the invention to other problems in a wireless network that may result in network disruptions or end user inconveniences.

In order to describe the various methods of the invention, FIG. 1 illustrates an example of a wireless network 100 in which embodiments of the invention can be practiced. It should be understood, of course, that this and other arrangements and processes described herein are set forth for purposes of example only, and other arrangements and elements and network configurations may be included in the network 100. Further, those skilled in the art will appreciate that many of the elements described herein may be functional entities that may be implemented as discrete components or in conjunction with other components, in any suitable combination and location, and by software, firmware and/or hardware.

In this example, the wireless network 100 is described and illustrated as a Code Division Multiple Access (CDMA) 1XRTT network, whereas the invention can be practiced with other wireless networks, including Universal Mobile Telecommunications System (UMTS), Time Division Multiple Access (TDMA), Wideband Code Division Multiple Access (WCDMA), General Packet Radio Service (GPRS) networks, 802.11 networks and other networks, including those that will be developed in the future. Generally stated embodiments of the invention can be practiced in networks that provide information to devices that describe the radio environment for the device.

The wireless network 100 includes a radio frequency (RF) network that provides radio connectivity and session management for circuit-switched and packet data technology based communication. Accordingly, wireless network 100 includes or interfaces with all of the elements necessary to route circuit-switched telephone calls and/or packet data communication through the network, including one or more wireless devices 110, a base station 120, base station controller (BSC) 130, mobile switching center (MSC) 150 and a packet data serving node (PDSN) 140. More specifically, the methods of the invention can be used in conjunction with a circuit-switched network, a packet data network, or both.

Some embodiments of the invention use Internet Protocol (IP), short message service (SMS), Short Data Burst services and/or other transport protocols. Wireless network 100 may also include a Home Location Register (HLR), Visiting Location Register (VLR), billing and provisioning systems, one or more gateways 170, the servers and infrastructure necessary to use short message service messages, and may include many other network elements. Application servers or third party reporting systems (depicted as network server 102 in the exemplary embodiment), may reside outside network 100 and can be used in conjunction with the present invention. Alternatively, the network server 102 may be part of the data collection and management system 160.

The data collection and management system 160, while depicted for purposes of illustration as functioning in conjunction with the packet data network, may receive data from nodes on a circuit-switched network or elements of the system may be located in a circuit-switched network and receive data from a packet data network. Gateways 170, network monitors and other network elements may be employed to facilitate transmission of data between the networks and the data collection and management system 160. Furthermore, in one embodiment, elements of data collection and management system 160 may be implemented on one or more network servers residing within the network. Alternatively, data collection and management system 160 may be implemented as a service hosted by a service provider other than the network operator, and elements of the system may therefore reside outside the network and be equipped to communicate with the various nodes in the network operator's network.

In FIG. 1, the device 110 collects event data that occurs at or is available to the device 110. Event data can be collected before, after, and/or during usage of the device 110. Event data can also be collected when the device is not being used. Receiving a neighbor list from a primary sector is an example of an event for which event data is collected. To collect event data, the client 110 has been provisioned with a client 112 that is configured to detect and record certain events or data that is relevant to the device 110. In this example, the client 112 is configured to collect data related to the neighbor list used by the device 110 to communicate in the network 100. As described in more detail below, the event data may also include information about the other towers and tower sectors that the device 110 sees or that are in radio communication or contact with the device 110.

The event data collected by the device 110 may also identify, in order, all of the sectors that are in radio contact with a device. This information can also be used in the generation of neighbor lists that are distributed by sectors. In some instances, this information can be used to generate multiple neighbor lists that may be based, for example, on device usage. As a result, the neighbor list distributed to one device may differ from the neighbor list distributed to another device.

After the event data is generated, the event data collected by the client 112 can then be uploaded to the data collection and management system 160. The cumulative event data collected by the system 160 from multiple devices can then be analyzed to determine the best neighbor list for each pilot. The cumulative event data collected in this manner from a large set of wireless devices ensures that the resulting neighbor lists account for multiple paths and directions that a wireless device may take within the network 100. The neighbor lists generated and recommended in this manner can then be pushed to the relevant towers and tower sectors, which then provide them to the various devices that communicate with the tower sectors. As a result, the neighbor lists can improve over time as additional event data is collected from the wireless devices operating in the wireless network 100.

In one embodiment of the invention, the data collection and management system 160 provides a service quality platform to dynamically generate and download to a population of wireless devices rule-based data collection profiles such as the collection profile 114. Data collection profiles may be generated manually by a network administrator, a software developer or other personnel involved in the operation of the network, created offline as a portion of a data analysis solution, or automatically generated based on network parameters or other events.

Data collection profiles define what information is to be collected on the devices in response to which conditions and events, as well as the conditions and events that cause the device to upload the collected information. Conditions or events include any occurrence in the network or on the device that the device can sense, such as receiving a neighbor list, or being in radio contact with other sectors in addition to a primary sector. Conditions or events may also include, by way of example, call dropping or a user pressing a button on the device. Conditions and events also include the passage of time, or a request from a network administrator that the device report information back to the server.

In the exemplary embodiment, a population of wireless devices that is to receive the data collection profile and execute data collection may be selected based on the characteristics, capacity, and availability of an end user's wireless device. As part of the wireless device qualification and selection process, particular attention is directed to implementing the collection of data in such a way as to avoid overwhelming end user devices. Similarly, when defining the data collection rules in the data collection profile, consideration is given to the impact on device and network resources of the desired data collection activity, and the rules defining profile download, data collection, and upload of collected data are defined in such a way as to avoid adversely impacting network performance.

For example, in some cases, uploading collected data may occur only in off-peak times when device and network activity is particularly low. Furthermore, because network monitoring and data collection activity is expensive in terms of the device and network resources utilized, in addition to the rigorous device qualification process, methods of the invention provide the ability to structure a data collection profile to ensure that extraneous data is filtered during the data collection process and that only the most relevant and reliable data is presented for analysis with regard to a particular issue.

In this example, the collection profile 114 is configured to record events that are related to neighbor lists, and sector usage. For each neighbor list received from a tower sector, the collection profile 114 ensures that the neighbor list, along with the sector than sent the neighbor list is recorded as event data. In one embodiment, the contents of the neighbor list may be included as part of the event data. In another embodiment, a unique identifier of the neighbor list (such as a hash of the message contents) may be utilized to reduce the size of the event metric. In the latter embodiment, the system would correlate the combination of unique sector identifier and neighbor list reference to recover the neighbor list in question from an appropriate network element as necessary.

Periodically throughout the call, as part of normal operation, the device automatically searches for new sectors. Periodically or as new sectors are identified, an event metric is generated that reflects the visible sectors to the device. The accumulation of these event metrics is the set of all sectors that the device 110 could see at the while utilizing the sector supplying the neighbor list as this reference sector.

During the course of a given radio session, the device may utilize different sectors as reference. Each time a new sector become the reference, the device and network automatically exchange the neighbor list of the new sector. As discussed above, each time this occurs a new neighbor list event metric is generated and accumulation of viewed sectors is initiated. Thus, over the course of a call, the neighbor lists of multiple sectors can be collected and used for optimization.

If an event occurs, such as a dropped or lost call, the device automatically resets its neighbor lists and reacquires the network. Once the network has been reacquired, the system will download the neighbor list from the new reference sector. However, prior to that point, the device is not constrained and performs a broader search for sectors. As a result, it is most likely to find a sector missing from a neighbor list in that interval. As such, the sector information captured immediately after a call, including the new reference sector is added to the list of sectors that are associated with the previous sector.

A further refinement of the solution is to determine if the dropped call is specifically attributable to a neighbor list error, in which case the system can impact the process by which a revised neighbor list is provisioned to the affected network elements. In other words, knowing that a dropped call is because of a neighbor list error enables the system to generate a neighbor list that can overcome this issue. This improves network performance by eliminating this issue from future calls. Advantageously, the problem can be detected using the event data that is automatically collected from provisioned devices, in contrast to the more difficult detection methods of conventional systems.

As one of skill in the art is aware, a neighbor list error is not always responsible for a dropped call or other event that occurs at a wireless device. Embodiments of the invention may also use event signatures to identify when the root cause of a particular event is likely to be a neighbor list error. For example, if a call is lost and a new sector is discovered as the device resets, it is likely that a neighbor list error was responsible for the lost call. This signature of a neighbor list error can be refined using other characteristics that are common to neighbor list errors. For instance, the relative strength of the newly discovered tower, phase of the received signals from one or more of the sectors detected by the device, and the like may be considered when determining if the root cause of an event was a neighbor list error. In this sense, the event data received from the set of wireless devices that are provisioned with the collection profile 114 can be filtered using the signature of a neighbor list error to increase the effectiveness and efficiency of the neighbor list that is ultimately recommended after analyzing the event data received from the set of wireless devices.

Figure 2:
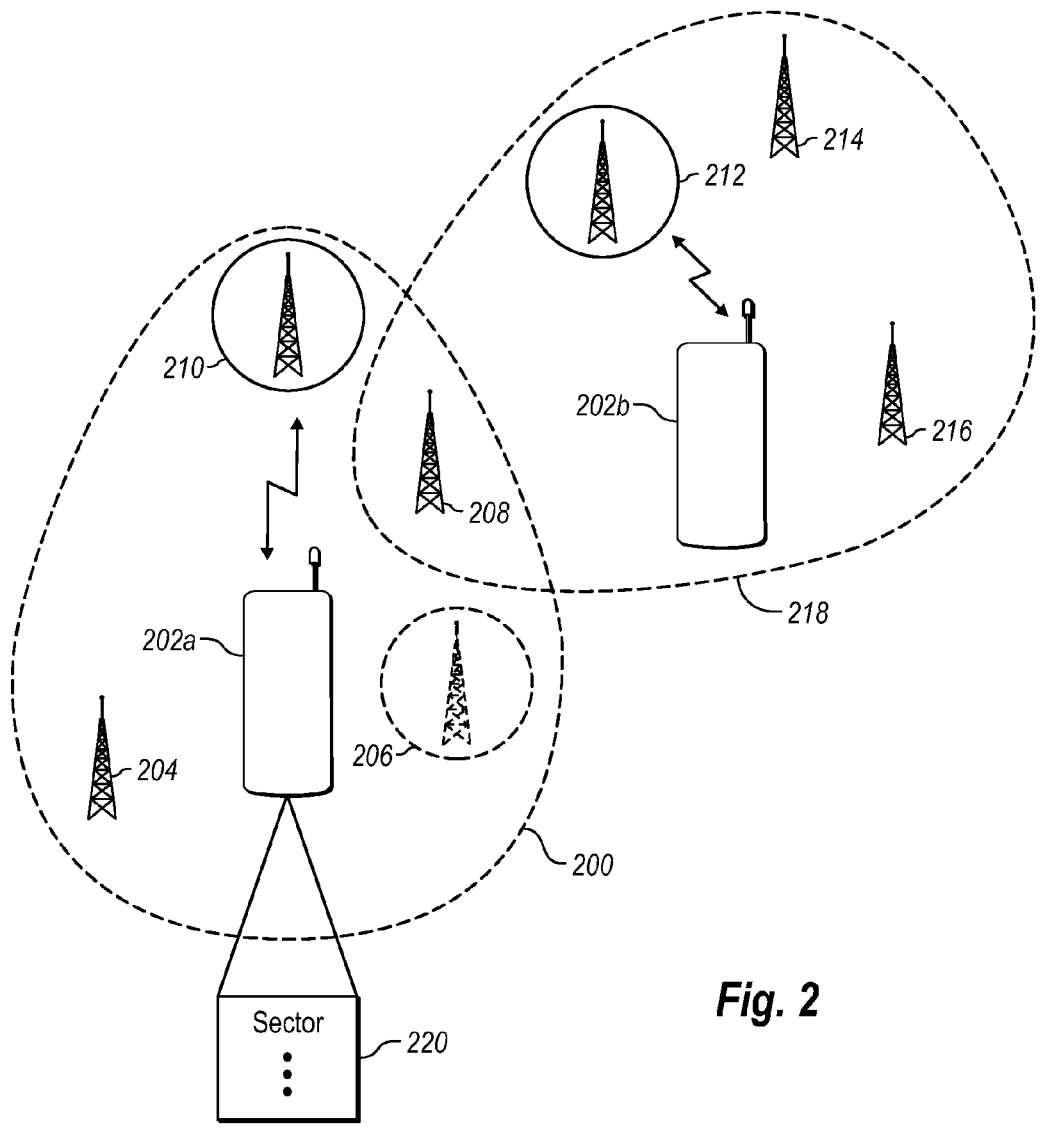
FIG. 2 illustrates an exemplary environment where a device receives a neighbor list from a sector.

In a typical wireless network, each tower has more than one sector. A tower may have three sectors or pilots, for example. As a result, the neighbor list may identify specific sectors. FIG. 2 is a block diagram illustrating the path or direction of travel that an exemplary device may follow in a wireless network and illustrates that a device may communicate with certain sectors of a tower. In this case, the device 202a represents a device in a first location and the device 202b represents the same device in a second location. As will be described, the neighbor list changes as the device moves from the first location to the second location.

In this example, the primary sector or pilot for the device 202a is from the tower 210. The primary sector is the sector that is currently handling the call or use of the device 202a. The device 202a may be in radio contact with other sectors, but the overall communication is managed through the primary sector. Thus, in this example, the call of the device 202a is completed through a specific sector of the tower 210.

When the call was initiated by the device 202a, a sector of the tower 210 delivered a neighbor list 220 to the device 202a. In this case, the neighbor list 220 identified certain sectors 208 and 204 which are on different towers. Further, the device 202a may receive signals from sectors 204 and 208 or see them. Because the device 202a is aware of these sectors 204 and 208, their radio signals do not interfere with the call.

In this example, the sector 206 is not on the neighbor list 220. As a result, the device 202a may not see or recognize the sector 206 and the radio signal from the sector 206 may interfere with the call and cause a lost or dropped call. Before the call is dropped, however, the neighbor list 220 is recorded along with other information in event data maintained by a client operating on the device 202a.

More particularly, the event data includes the neighbor list 220 and identifies the tower and sector that delivered the neighbor list 220. The event data may also include whether the device 202*a* can see or actually receives radio signals from the sectors included in the neighbor list 220. It may be the case that the device 202*a* is not in radio contact with a particular tower sector even if the tower sector is on the neighbor list 220.

After a call is lost and the device resets, all of the sectors that the device 202*a* can see or are in radio contact with the device 202*a* are also included in the metrics of the event data. After the dropped call in this example, the device 202*a* may see the sectors 210, 208, 204, and 206 as indicated by the set 200. This information is included in the event data. The set 200 is considered, in one embodiment, to be the set of sectors that the device 202*a* believes should be in the neighbor list delivered by the tower 210. If a significant number of other devices also report that the set 200 is the set of towers that should be included in the neighbor list 220, then the neighbor list 220 can be updated quickly. In other words, the neighbor lists can be improved using the event data provided by a set of wireless devices. Further, FIG. 2 illustrates that the location of the device 202*a* may have an impact on the neighbor list. Another device in a different location may have see different sectors. Also, the direction in which a sector is approached can also impact the development of a neighbor list.

As the device moves in the network to the location represented by the device 202*b*, the call is ultimately transferred to the primary sector 212 and the neighbor list 220 is either updated or replaced by the primary sector 212. The set 218, which includes the sectors 208, 214, and 216, represents the set of sectors that are presently on the neighbor list 220 provided by the sector 212. The set 218 may also represent the set of sectors that the device 202*b* thinks should be on the neighbor list received from the reference sector 212. The cumulative event data from a large set of wireless devices operating in a wireless network enables the recommended neighbor lists, which are derived from the cumulative event data, to account for many of the factors that contribute to neighbor error lists. The resulting neighbor lists that are derived from the cumulative event data therefore improve the performance of the wireless network. As illustrated in FIG. 2, the cumulative event data may result in the sector 206 being included in a neighbor list delivered by the sector 210. As a result, wireless devices no longer experience interference from the sector 206 because the improved neighbor list enables the wireless device to account for the sector 206.

Figure 3:
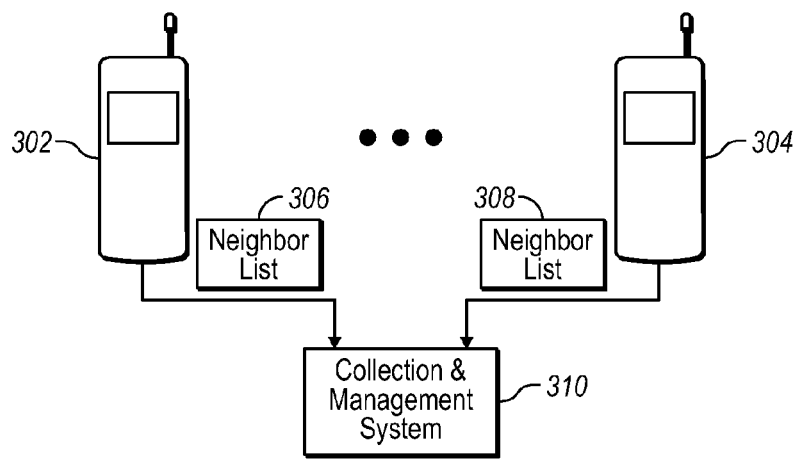
FIG. 3 illustrates an example of a system for collecting and evaluating neighbor lists from devices operating in a network to improve the neighbor lists distributed to the devise.

FIG. 3 is a block diagram illustrating the collection of event data including neighbor lists. In this example, the devices 302 and 304 represent a set of devices that have been provisioned with a client and a collection profile. The collection profile effectively configures the devices 302 and 304 to collect the sort of event data that can be used to evaluate neighbor lists and therefore reduce or eliminate neighbor list errors. The devices 302 and 304 collect information related to neighbor lists when calls are dropped or lost as well as when the call is not dropped or lost.

Further, the devices 302 and 304 may collect the same information regardless of whether the root cause of a dropped or lost call (or other event) was a neighbor list error. The collection and management system 310 typically has more processing power available to examine the context of the various events to ascertain whether the likely root cause of the event was a neighbor list error. Thus, the event data reported by the devices 302 and 304 includes information relating to neighbor lists and may include other contextual metrics that enable the collection and management system 310 to determine whether the likely root cause of an event was a neighbor list error. As previously described, for example, a signature may be applied to the collected event data to ensure that the root cause of an adverse event experienced by a device is attributable to a neighbor list error.

In FIG. 3, the event data including the neighbor list data 306 and 308 are delivered to the data collection and management system 310. As previously described, the neighbor list data includes at least the neighbor list provided by the primary sector as well as other sectors that the device was aware of or that the device thought should be in the neighbor list. The data 306 and 308 can also include information collected after an event is experienced or collected at any other time. The data 306 and 308 can also identify sectors that were in radio contact with the devices 302 and 304 as well as the order in which radio contact was made. In other words, the neighbor list data 306 and 308 may include sectors that are not found on the neighbor list provided by the primary sector. This information is accumulated by the system 310. Over time, and after receiving neighbor list data 306 and 308 from a large number of different devices, the system 310 can generate recommended neighbor lists that are derived directly from the cumulative neighbor list data provided by the set of devices represented by the devices 302 and 304.

The neighbor list data 306 and 308 collected by devices 302 and 304 as they experience events such as dropped calls can therefore be used to eliminate neighbor list errors. The elimination of neighbor list errors translates directly to fewer dropped calls in the wireless network. Further, by collecting event data from multiple devices, the collection and management system 310 can generate and recommend a neighbor list that accounts for multiple device paths, directions of travel, and device locations within the wireless network. The collection and management system 310 can also generate multiple neighbor lists for a given sector. The specific neighbor list distributed to a device may therefore account for device usage or expected device usage.

Collecting event data that includes neighbor list data from multiple devices enables neighbor lists to be generated that account for variable radio propagation, unknown terrain that can impact the visibility of sectors in some instances, deployment errors in the network configuration, power changes, and load based changes. The resulting neighbor lists also account for the multiple paths and directions of travel that a device may experience such that different portions of the neighbor lists are exercised. The neighbor lists determined in this manner can then be pushed to the relevant sectors in the wireless network and then delivered to end user devices. Over time, the neighbor lists received by devices in the network are more accurate and the occurrence of events due to neighbor list errors decreases.

Figure 4:
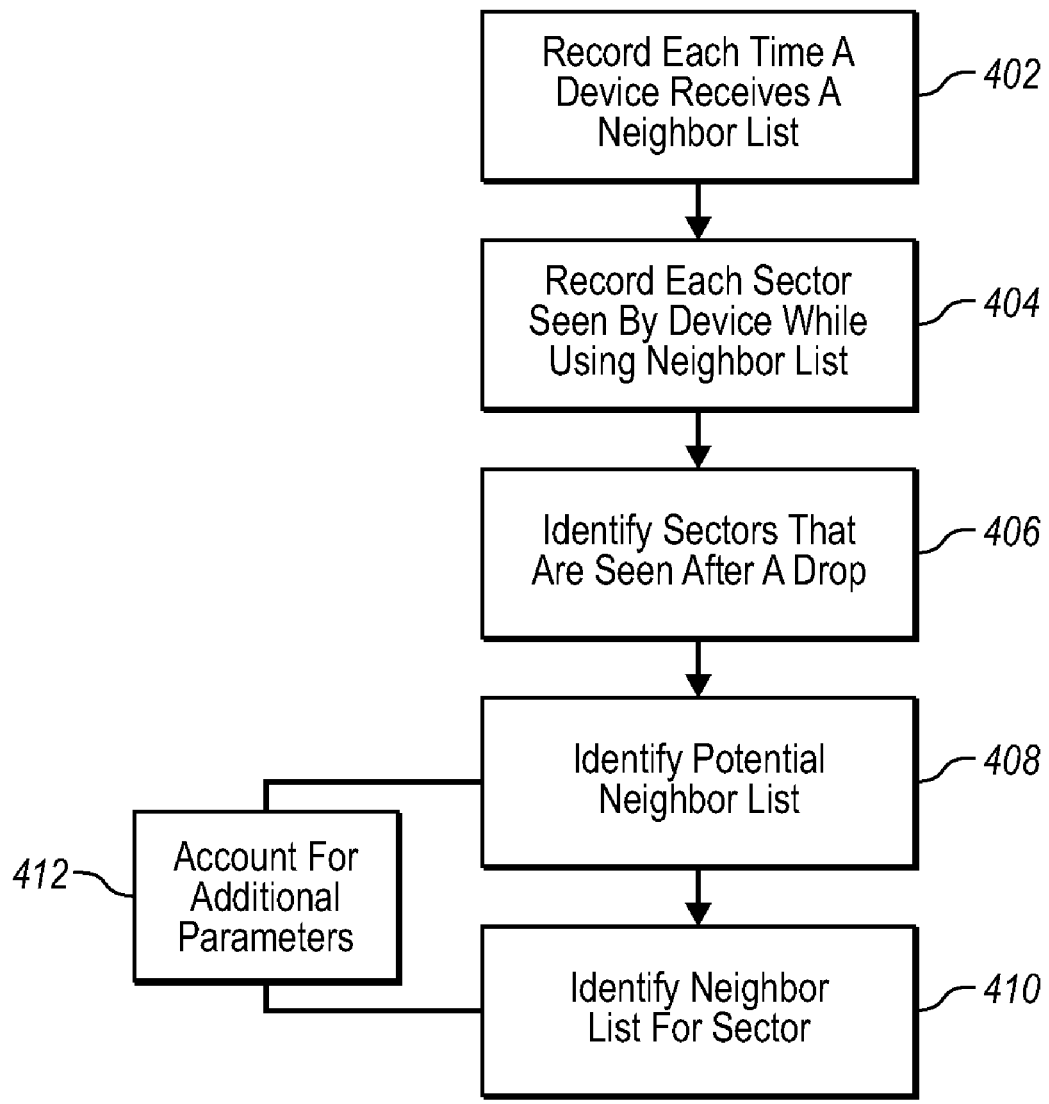
FIG. 4 is a flow diagram illustrating an exemplary method for generating neighbor lists.
Figure 5:
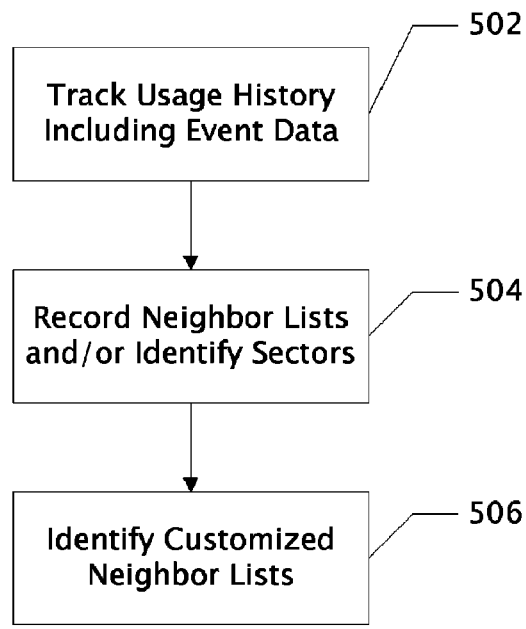
FIG. 5 illustrates a method for generating a customized neighbor list for a particular device based on the current and/or past usage of the device.

FIG. 4 illustrates an exemplary method for generating neighbor lists. This embodiment begins by recording 402 event data each time a device receives a neighbor list. The collection of event data can occur at other times. For instance, a device may record event data by identifying sectors that are in communication with the device at any given time. Further, the event data may also be associated with a geographic location (although the identification of a sector may be sufficient) as the event data may be updated some time after the event data is collected by a device.

As previously discussed, the neighbor list identifies a set of towers or sectors that the device expects to see. The device also records 404 each sector seen by the device while using the neighbor list. This information by itself, when combined with similar data from other wireless devices can be used to enhance neighbor lists. For example, the neighbor list may include sectors that are not visible to the device. If other devices report similar event data, then the sector that is not visible becomes a candidate for removal.

Next, the method continues by identifying 406 all sectors that are seen by the device after a dropped call or other event. The sectors seen or in radio contact with the device can also be identified when a call is completed normally in addition to when an adverse event such as a dropped call occurs. In this example, the device may be configured to identify sectors that are seen by the device after a dropped call but that were not present in the neighbor list that was being used by the device prior to the dropped call. This can be achieved at the device or at the collection and management system by performing a compare between the sectors currently seen by the device with the metrics recorded during the call or to the previous neighbor list. As previously stated, the event data may be filtered using an event signature to provide more assurance that the reason for the event was a neighbor list error. Further, it may not be necessary for the device to record the initial neighbor list as that information is typically known and can be readily ascertained.

Identifying sectors 406 that are seen or are in radio contact with a device can be used for more than adding sectors to a neighbor list. Embodiments of the invention contemplate using the sectors identified by a device regardless of whether a neighbor list problem is actually present. For example, a sector with a high offset compared to other sectors suggests that the sector should not be added to a neighbor list and may be indicative, by way of example, of poor network topology. For example, to a device that has an unobstructed view of a remote sector that serves as the primary sector, all of the local sectors will appear as missing neighbors. It would be error to add the local sectors to the neighbor list of the remote sector. An analysis of the associated signature (high offset, physical proximity of local sectors, etc.) could be used to resolve the issue appropriately (identify that a topology change may be necessary, for example). At the same time, this is an example of a remote sector that should not be on the neighbor lists of the local sectors. Thus, embodiments of the invention also contemplate removing certain sectors from neighbor lists after evaluating the event data.

For example, identifying an environment where a sector that is to be added as a neighbor has an unusually large phase offset than other sectors in the neighbor list could potentially identify a power or azimuth problem with that sector. Adjusting the power or azimuth of that tower would manifest itself in the event data reported by the devices. In other words, that particular sector would no longer be visible and would therefore no longer be included in the event data.

The device or the collection management system (in the case where all the collected data is uploaded to the management system) can then identify 408 or recommend a potential neighbor list for each sector. In other words, the comparison between sectors seen after a call (or other event) and the previous neighbor list can be used to generate a set of sectors that the device should have seen for the primary sector being evaluated. Over time, the collection and management system can receive similar neighbor list data from a large set of wireless devices. This information can be used to identify 410 a recommended neighbor list for the sector in question.

The event data reported by the devices operating in a network can be used to formulate suggested neighbor lists. The recommendations or suggestions for existing neighbor lists can include adding missing sectors to the neighbor lists as well as eliminating certain sectors from the neighbor lists. For example, identifying 410 a neighbor list can be expanded by accounting 412 for additional parameters that may be related to neighbor list errors. For a certain sector, the generation of a neighbor list can also include evaluating certain sectors based on the strength and/or duration of sampling of the radio signal from the sector. Sectors that appear in an existing neighbor list, but at lower powers, can be candidates for removal from a given neighbor list. Other parameters include size of the neighbor list, phase offset of a particular sector relative to other sectors visible to the device, power, load based parameters, time of day, and the like or any combination thereof.

In addition to generating neighbor lists for aggregate device usage as discussed above, embodiments of the invention also relate to systems and methods for generating neighbor lists for specific devices. These specific neighbor lists may account for the usage history of a device as well as for the scenarios that a particular device has encountered. The ability to customize a neighbor list for a particular device is likely to improve network performance at least from the perspective of the device. For instance, the sector selected for a call handoff can be predicted with greater accuracy and more reliability using neighbor lists that are customized for the device or by using neighbor lists as discussed herein.

In one embodiment, generating customized neighbor lists often begins with a device that collects usage history, which often includes event data as discussed previously. A device (or a remote server) tracks 502 the usage history of the device. Tracking the usage history can occur over time an may include scenarios that the device encounters. For example, the usage history may include tracking the order in which sectors are used during device usage. The usage history may include recording the device's location during usage of the device. The usage history may also include one or more neighbor lists as well as the order in which those neighbor lists were received.

As the device is used (calls, network access, etc.) and even when the device is not actively being used but is powered, the device can record neighbor lists and/or identify primary sectors 504. This information can be included in the usage history. Recording neighbor lists, as indicated above, may include recording a series of neighbor lists in the order that they are received. The series of neighbor lists could identify a particular usage of a network by a device. Over time, additional series of neighbor lists can be collected, the primary sectors and order of use can also be collected over time.

The usage history, which is another form of event data, can then be uploaded to a server such as the data collection and management system 160 illustrated in FIG. 1. The system 160 can process the usage history to identify 506 potential neighbor lists for a particular device.

Figure 6:
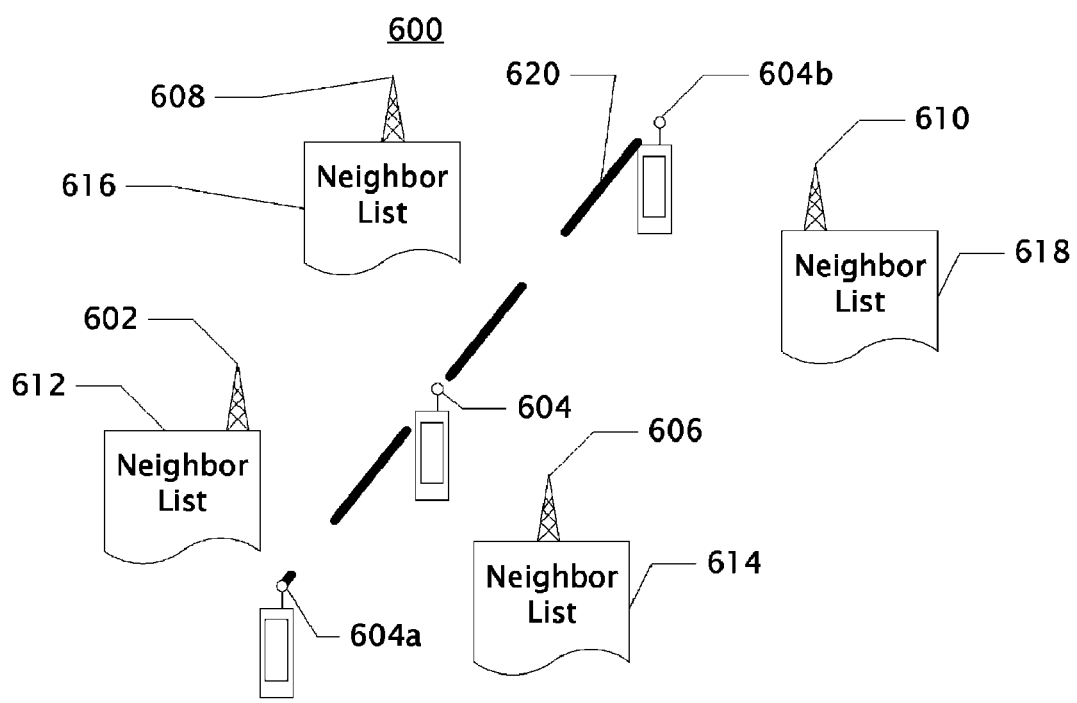
FIG. 6 illustrates a diagram illustrating a mobile device and the customized neighbor lists that are used based at least on expected usage of the device.

FIG. 6 illustrates a network that includes the generation and/or the use of customized neighbor lists. From a neighbor list generation perspective, the path 620 may represent a usage history. This may be determined by identifying the location f the device over time to identify, in one example, a history of usage. Over time, an expected path can be derived for the user. For example, a user may frequently travel along the path 620. As the user uses the device, a history of the neighbor lists received by the device 604, the order in which the neighbor lists are received, the sectors actually used by the device 604, the transitions from one sector to another sector, and the like can be collected as event data. The usage history or event data can then be processed by the device or by a data collection system to identify or generate a customized neighbor list. The customized neighbor list may identify preferred sectors that should be used in order to ensure continuous network service. The customized neighbor list is thus based on the usage history of the device.

For example, FIG. 6 illustrates a device 604 that may be moving on a path 620 in a wireless network 600. The path 620 represents one example of a usage of the device or of an expected usage based on a tracked history of the user. The usage may include movement of the device in the network 600 during a telephone call, for example. The device 604a represents a first location on the path 620 and the device 604b represents a second location on the path 620.

In this example, the device 604a is communicating with a primary sector on the tower 602 and the tower 602 has provided the device 604a with a neighbor list 612. As this usage is tracked over time and a customized neighbor list is generated, the neighbor list 612 may become formulated such that the device is directed to transition, successively, to the towers 606, 608, and 610. Each tower delivers in turn the neighbor lists 614, 616, and 618, which have also been prepared according to the usage of the device 604.

When neighbor lists are customized for a particular device, care is usually taken to ensure that the device does not experience other problems such as interference from a tower that is not on the neighbor list. Further, the neighbor lists that are generated for a particular device can also be updated as the usage history of the device changes. Also, other factors such as direction of travel, time of day, and the like can be considered when selecting a new sector from the neighbor list based on the usage history. In another example, the customized neighbor lists for a user may differ from neighbor lists that are generated for aggregate usage in the sense that some neighbors may be given higher priority, for example, for call handoffs.

In addition, the neighbor lists generated as described herein can be analyzed with respect to time or day or other load based factors. This analysis identifies whether the load of the network or of the tower is a contributor to variations in the neighbor lists. If it is found that load impacts variations in neighbor lists, then it is likely that capacity may be a problem in that particular area. Thus, the event data that includes information relating to neighbor lists can be used to address neighbor list errors, power or azimuth problems in sectors, capacity issues in the wireless network, deployment issues, and the like. In one embodiment, sectors can be identified to optimize the experience from the perspective of devices. This change in deployment can be influenced by the devices that would be impacted, expected network loads, and the like.

As described above, embodiments of the invention are not limited to efforts to identify missing neighbors. Rather, embodiments of the invention are further directed to methods for identifying the optimal or ideal neighbor list. This can include making no change to a neighbor list, adding sectors to a neighbor list, and/or disqualifying sectors to a neighbor list. Optimizing the neighbor lists distributed to devices can therefore use event data that is generated by the devices at any time and is not limited to event data generated when an event such as a dropped call occurs. Sectors in radio contact with a device when a call is normally completed, an order in which a device encounters sectors in a network, device start up conditions or network acquisition situations, sector phase offsets, physical locations of sectors, event signatures, and other parameters discussed herein, and the like are examples of events and metrics that are used in the optimization of neighbor lists.

Embodiments within the scope of the present invention include computer-readable media for carrying or having computer-executable instructions or data structures stored thereon. Such computer-readable media can be any available media which can be accessed by a general purpose or special purpose computer. By way of example, and not limitation, such computer-readable media can comprise physical computer-readable media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, any instructions and data which cause a general purpose computer, special purpose computer, or special purpose processing device to perform a certain function or group of functions. The computer executable instruction may be, for example, binaries, intermediate format instructions such as assembly language, or even source code. Although not required, the invention will be described in the general context of computer-executable instructions, such as program modules, being executed by computers in network environments. Generally, program modules include routines, programs, objects, components, data structures, etc. that perform particular tasks or implement particular abstract data types.

Those skilled in the art will appreciate that the invention may be practiced in network computing environments with many types of computing system configurations, including personal computers, hand-held devices, multi-processor systems, microprocessor based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

The present invention may also be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method for generating a neighbor list for use by a primary sector, the method comprising:
   receiving event data, said event data recorded at a plurality of devices operating in a network, at a data collection and management server, to generate a recommended neighbor list;
   identifying additional sectors that are in radio contact with the device after experiencing an event that resets neighbor list data of the device, wherein the additional sectors are included in the event data;
   comparing a phase offset of a particular sector to a phase offset of other sectors included in the event data;
   excluding the particular sector from the recommended neighbor list for the primary sector when the phase offset of the particular sector is comparatively larger than the phase offset of the other sectors;

wherein said event data recorded at each device comprises each sector that is visible to said device while using a neighbor list provided by said primary sector.

2. The method of claim 1, further comprising:
generating the recommended neighbor list by adding, to the recommended neighbor list, sectors visible to the device but not included in the current neighbor list.

3. The method of claim 2, further comprising:
adding the additional sectors visible to the device to the recommended neighbor list.

4. The method of claim 1, further comprising:
identifying sectors that appear in a neighbor list with low power as candidates for removal from the current neighbor list, wherein the power of each sector visible to the device is included in the event data.

5. The method of claim 1, further comprising at least one of:
identifying the particular sector as a candidate for removal if the particular candidate is on the current neighbor list; or
not recommending the particular sector for inclusion in the recommended neighbor list.

6. The method of claim 1, further comprising at least one of:
adjusting one of a power or an azimuth of the particular sector; or
identifying an unexpected topology in the network.

7. The method of claim 1, further comprising:
incorporating load based parameters, and time of day into the generation of the recommended neighbor list.

8. The method of claim 1, further comprising:
pushing the recommended neighbor list to the primary sector.

9. A method for generating recommended neighbor lists for sectors in a wireless network, the method comprising:
receiving event data recorded according to a collection profile by each device in a set of devices when said device receives a current neighbor list from a sector, said event data comprises a particular sector that provided the neighbor list and all sectors that are visible to the device;
identifying new sectors visible to the device after usage of the device that are not included in the current neighbor list;
identifying a power or azimuth problem in a certain sector in the current neighbor list based on a phase offset associated with the current sector when compared to phase offsets of other sectors in the current particular neighbor list and excluding the certain sector from a recommended neighbor list; and
identifying the recommended neighbor list that includes the new sectors.

10. The method of claim 9, further comprising one or more of:
recommending sectors for inclusion or exclusion in the recommended neighbor list based on a phase offset of each sector;
identifying unexpected phase offsets of sectors in the current neighbor list and in the new sectors; and
analyzing variations in the current neighbor list based on load parameters in the wireless network.

11. The method of claim 9, further comprising:
identifying a capacity problem based on load based variations in neighbor lists derived from the event data received from the set of devices.

12. The method of claim 9, further comprising:
identifying a deployment problem in the wireless network based on the event data.

13. The method of claim 9, further comprising one or more of:
accumulating event data from the set of devices, wherein the event data includes additional sectors that are either included in the recommended neighbor list or removed from the current neighbor list; or
recommending sectors for removal from the current neighbor list that have low power or that do not appear at high power in the event data from the set of devices.

14. In a wireless network that provides guidance information to participating device as to which network elements can or should be utilized to maintain wireless communications, a method for configuring the wireless network, the method comprising:
receiving event data from one or more wireless devices, said event data recorded at said wireless devices, said event data including one or more events and further comprising:
radio information identifying current guidance information utilized by the one or more wireless devices during the one or more events,
current radio resources utilized at the time of the one or more events included in the event data, and
radio elements of the network utilized during the one or more events included in the event data;
providing the event data to a data collection and management server,
whereby the data collection and management server
utilizes the event data to generate new configuration data to be distributed as guidance information to the one or more wireless devices for subsequent events;
identifies a power or azimuth problem in a sector based on a phase offset associated with that sector when compared to phase offsets of other sectors in a particular neighbor list; and
excludes the sectors with the power or azimuth problem from the configuration data;
receiving said new configuration data; and
configuring said wireless network according to said new configuration data.

15. The method of claim 14, where the guidance information comprises a
neighbor list.

16. The method of claim 14, where the current radio resources comprises
a sector.

17. The method of claim 14, wherein the radio element of the network comprises sectors used within the one or more events.

18. The method of claim 14, wherein the wireless devices include one or more of cellular telephones, pagers, laptop computers, personal digital assistants or network compatible devices.

19. A base station for a wireless network, comprising:
a computing device having
a memory storing a neighbor list,
the neighbor list identifying towers with a sector of the base station,
wherein the neighbor list is generated through analysis of neighbor list history data of multiple handheld computing devices while the multiple handheld computing devices are within a sector of the base station,
wherein said neighbor list history data comprises at least one neighbor list generated by an analysis of event data which analysis compares a phase offset of a particular sector to a phase offset of other sectors included in the event data; and excludes the particular sector from the neighbor list when the phase offset of the particular sector is comparatively larger than the phase offset of the other sectors;

wherein said event data comprises each sector that is visible to each device in a primary sector while using a neighbor list provided by said primary sector.

20. The base station of claim 19, wherein the multiple handheld computing devices are cellular phones.

21. The base station of claim 19, wherein the computing device receives updates to the neighbor list from a network server storing the neighbor list data from the multiple handheld computing devices.

22. The base station of claim 19, wherein the neighbor list history data includes a history of neighbor lists received by each of the handheld computing devices, sectors utilized by the handheld computing devices, transitions of each of the handheld computing devices between sectors, and location of the handheld computing devices over time.

23. The base station of claim 19, wherein the base station is one of a plurality of base stations for the wireless network.

24. A system, comprising:

a server configured to receive neighbor list history data from a plurality of wireless computing clients, the neighbor list history data including a history of neighbor lists received by each of the wireless computing clients, sectors utilized by the wireless computing clients, transitions of the wireless computing clients between sectors, and location of the wireless computing clients over time, the server comprised of a memory storing data collection and management logic that when executed by a processor causes an update of neighbor lists based on analysis of the neighbor list history data, wherein said neighbor lists received by each of the wireless computing clients comprise at least one neighbor list generated by an analysis of event data which analysis compares a phase offset of a particular sector to a phase offset of other sectors included in the event data; and excludes the particular sector from the neighbor list when the phase offset of the particular sector is comparatively larger than the phase offset of the other sectors;

wherein said event data comprises each sector that is visible to each device in a primary sector while using a neighbor list provided by said primary sector.

25. The system of claim 24, wherein the neighbor list received by each of the wireless computing clients is received from a base station of the system.

26. The system of claim 24, wherein the updated neighbor lists are transmitted to corresponding base stations identified through the updated neighbor lists.

27. The system of claim 24, wherein the updated neighbor lists are transmitted to corresponding wireless computing clients providing the neighbor list history data.

28. The system of claim 24, wherein the wireless computing clients are cellular phones.

29. The system of claim 24, further comprising:

a base station providing each of the wireless computing clients within range of the base station with a most recently updated neighbor list associated with the base station.

* * * * *